Feb. 24, 1970   D. RITTMAN   3,496,852
PHOTOGRAPHIC SHUTTER WITH ELECTRONIC TIME FORMING DEVICE
Filed Dec. 7, 1966   2 Sheets-Sheet 1
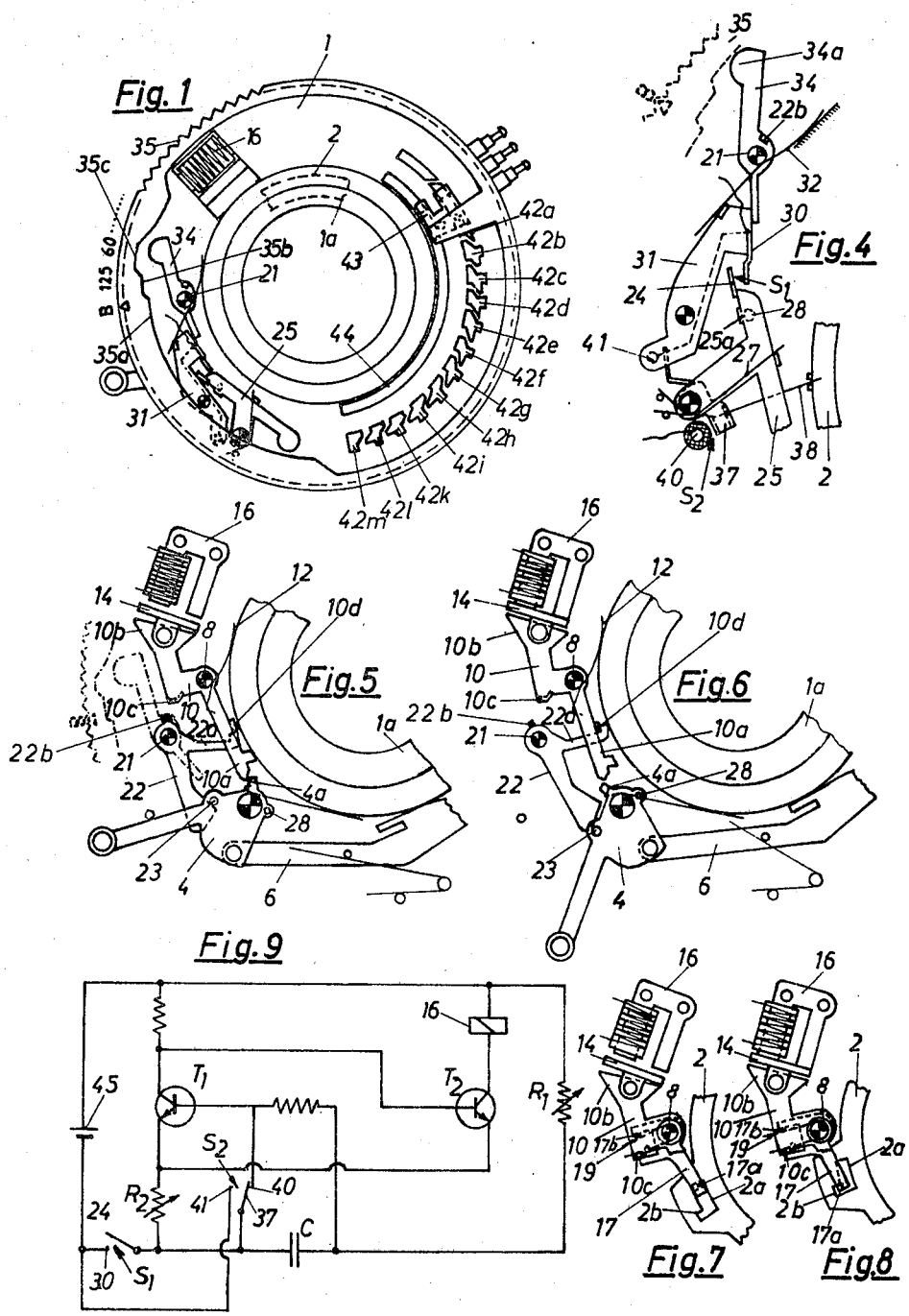
INVENTOR
Dieter Rittman
BY
March, Gillette & Wyatt
ATTORNEYS

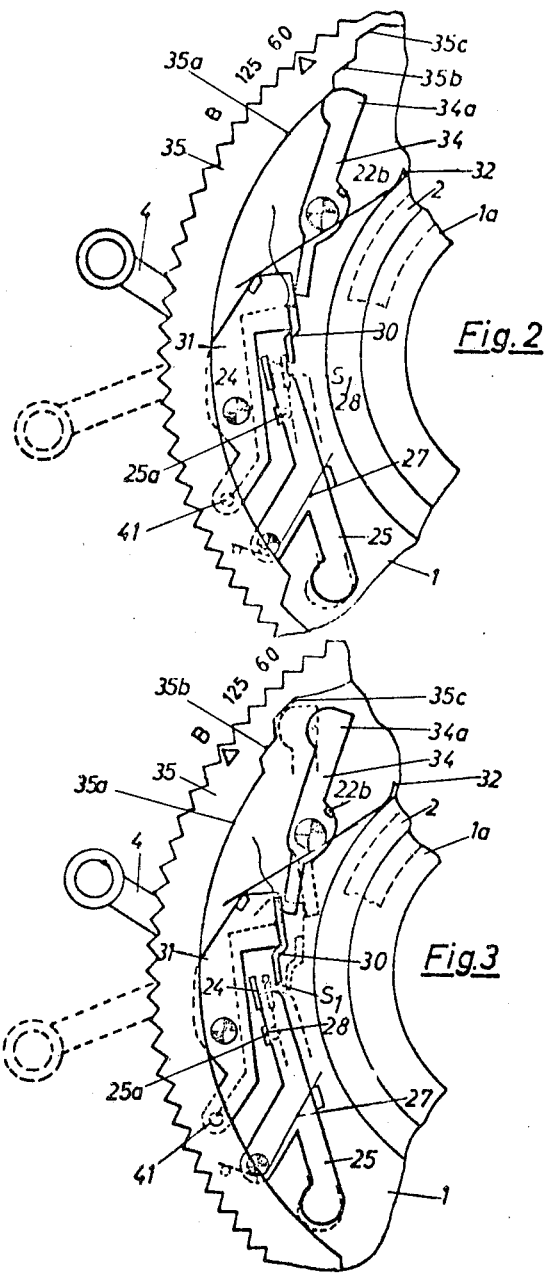

United States Patent Office 3,496,852
Patented Feb. 24, 1970

3,496,852
PHOTOGRAPHIC SHUTTER WITH ELECTRONIC TIME FORMING DEVICE
Dieter Rittman, Calmbach, Germany, assignor to Prontor-Werk Alfred Gauthier, G.m.b.H., Calmbach-Black Forest, Germany, a corporation of Germany
Filed Dec. 7, 1966, Ser. No. 599,843
Claims priority, application Germany, Dec. 10, 1965, P 38,321
Int. Cl. G03b 9/64, 9/00
U.S. Cl. 95—53.3       8 Claims

ABSTRACT OF THE DISCLOSURE

A photographic shutter which is connected to an electronic timing device, which can be set to various exposure times. There is a switch arrangement which has a countercontact that automatically moves into position to prevent any current flow when taking "B" pictures. This countercontact tongue makes certain that the timing device is shut off and therefore any unnecessary load on the battery is avoided.

---

This invention relates to a photographic shutter with an electronic timing device which can be set to various exposure time values by means of a setter and has a switch arrangement which serves to electrically connect the timing device to a power source when releasing and during the course of the functioning of the shutter.

It is an object of this invention to provide a shutter of the above type of relatively simple structure that assures reliable action wherein the current flow from the power source to the electronic timing device is interrupted when taking "B" pictures.

This object and other advantages of this invention are provided by a switch arrangement that has at least one movably mounted countercontact cooperating with a contact tongue, which countercontact automatically moves into a position preventing contact making as a function of the setting of the setter during releasing and during the run-off of the shutter when taking "B" pictures. This measure guarantees that when taking "B" pictures the electronic timing device will remain switched off without special actuations requiring the attention of the photographer so that in this special type of exposure any unnecessary load on the battery is avoided.

As to the details of the arrangement of the movable countercontact, it may be attached advantageously to a pivoting contact level which cooperates indirectly or directly with the setter in such fashion that when it is set to "B," the contact lever takes the countercontact out of the range of motion of the contact tongue of the switch arrangement under the influence of a spring during the winding and releasing process. One simple embodiment for influencing the contact lever by the setter is provided according to this invention by a contact lever that is biased by a cooperating support lever, and by a recess in the setter into which the support lever can dip upon release when the setter is in "B" position, enabling the contact lever to move the countercontact into an unengageable position.

In case the switch arrangement consists of several switches serving to connect the electronic timing device to its power source during the release of the shutter and during the course of its function; it can be expedient, in an advantageous embodiment of this invention, to design the contact lever as a two-armed lever having one end carrying the countercontact of a contact maker actuatable when releasing the shutter, and having the other end of the contact lever carrying the countercontact of a contact switch in parallel to the contact maker and influenceable by the shutter drive.

Various other objects, features and advantages of this invention will be apparent from the following specification, claims and the drawings appended hereto wherein:

FIGURE 1 is a view of one side of the shutter mechanism of this invention illustrating the setter serving to set the exposure time and the parts cooperating with it.

FIGURE 2 is an enlarged fragmentary view of a portion of the shutter mechanism of FIGURE 1 illustrating the setter set to an instantaneous exposure time. The lever arrangement of the contact maker of the electronic timing device is shown in its normal position by solid lines, and the position assumed by the contact maker during the winding and releasing process is shown by dashed lines.

FIGURE 3 is a view similar to FIGURE 2 with the parts in the "B" setting, wherein the dashed lines indicate the position assumed by the parts of the contact switch at the end of the winding and releasing process.

FIGURE 4 is a fragmentary view of the shutter mechanism of FIGURE 1 showing an additional switch, assigned to the electronic timing device and actuatable by the sector ring, and illustrated in the position corresponding to the open position of the shutter blades.

FIGURE 5 is a fragmentary view of a portion of the shutter mechanism of FIGURE 1 illustrating the winding and releasing member and the parts cooperating therewith in their normal position.

FIGURE 6 is a view similar to FIGURE 5 with the parts illustrated in the position assumed at the end of the winding and releasing motion.

FIGURE 7 is a fragmentary view of a portion of the shutter mechanism of FIGURE 1 illustrating the locking lever influenceable by the armature lever and a portion of the sector ring cooperating with it shown in the normal position corresponding to the closed position of the shutter blades.

FIGURE 8 is a view similar to FIGURE 7 with the parts illustrated in the locked position corresponding to the open position of the shutter blades.

FIGURE 9 is a circuit diagram of the electronic timing device of this invention.

Referring now to the drawings, there is illustrated a self-winding photographic shutter having a housing base 1 provided with a concentric tube nipple 1a on which is mounted a sector ring 2 serving to drive several sectors and not shown in detail. A back and forth motion is imparted to the sector ring 2 by a drive system not shown in detail which can be brought into the wound position and can be released for run-off at the end of the winding motion by a winding and releasing member 4 mounted to the underside of the housing base 1 with a driving pawl 6 being interposed as illustrated in FIGURES 5 and 6.

Associated with the drive of the shutter sectors for achieveing different exposure times is a device controlled by an electronic trip circuit and which blocks the shutter drive for the duration of the set exposure time by acting, for instance, upon the sector ring 2 in the open position of the sectors. The connecting link between the electronic switching device and the shutter drive is an armature lever 10 which is mounted on a pin 8 fixed in the base 1 and which, with its one arm 10a and under the influence of a return spring 12, makes contact with an extension 4a of the winding and releasing member 4. Linked to its other arm 10b is an armature 14 which cooperates with an electromagnet 16 influenceable by the electronic timing device.

As may be seen from FIGURES 7 and 8, mounted concentrically, with the armature lever 10 on the pin 8 is a locking lever 17 which is biased relative to the armature lever 10 and which engages a slot 2a of the sector ring 2 by means of a tab 17a. The arrangement is such that the armature lever 10 and the locking lever 17 each have a tab 10c and 17b, respectively, against each of which the respective leg of a winding spring 19 laid around pin 8 supports itself. Slot 2a is provided with an extension 2b where tab 17a of the locking lever 17 can drop in when sector ring 2 changes into the position corresponding to the open position of the sectors, thereby blocking the shutter drive for the rest of the run-off motion.

To take "B" pictures, there is mounted on a pin 21 at the underside of the housing base 1 a catch lever 22 which cooperates during the winding process with a drive pin 23 on the winding and release member 4. The lever 22 has an arm 22a that can drop in ahead of a tab 10d on the armature lever 10 in the appropriate setting of the shutter, as soon as its armature 14 has made contact with the electromagnet 16 in the course of the winding motion.

Actively cooperating with the winding and release member 4 is a contact maker $S_1$, by means of which the electronic timing device receives voltage during the winding and release process. Contact maker $S_1$ has a contact tongue 24, fastened to a three arm switch-on lever 25 mounted at the upper side of housing base 1. The lever 25 has a tab 25a, which under the force of a spring 27 contacts a pin 28 of the winding and release member 4 and assumes, in the normal position of the shutter, the position illustrated in FIGURES 1 to 3. Cooperating with the contact tongue 24 is a movable countercontact 30 attached in the disclosed embodiment to a pivoted contact lever 31. The contact lever 31 is loaded by a spring 32 tending to turn it in a clockwise direction thereby biasing the countercontact 30 away from the contact tongue 24. Under the effect of the spring 32, the contact lever 31 is biased into contact with a two-armed support lever 34 which, in turn, cooperates with a setter 35 serving to set the exopsure time as a function of its setting by permitting or preventing movement of the support lever 34.

The arrangement of the disclosed embodiment, as may be seen particularly from FIGURES 2 and 3, is such that the setter 35 is provided with a concentric cam 35a engaging the lever 34 during the winding and release process when an exposure time of 1/60 sec., for example, is set by the electronic switching device, so that the contact lever 31 remains in its starting position as illustrated by full lines in FIGURES 2 and 3. Accordingly, the switch-on lever 25 is not hindered in its motion by the concentric cam 35a.

Adjacent to the concentric cam 35a is a shoulder 35b which positions itself opposite the free end 34a of the supporting lever 34 when the shortest achievable, unretarded exposure time is set. Following the shoulder 35b is a recess 35c into which the support lever 34 can move when the setter 35 is set to "B," as illustrated in phantom line in FIGURE 3, whereby the contact lever 31 is released to move the countercontact 30 away from the contact tongue 24. In this setting the range of motion of the switch-on lever 25 is limited by the concentric cam 35a from engaging the released contact lever 31 thus preventing switch $S_1$ from making contact during the winding and releasing process.

In order that the armature lever 10 will be retained in contact with electromagnet 16 by catch lever 22 only when taking "B" exposures, the catch lever 22 is attached to the support lever 34 for coaxial rotation therewith as illustrated in FIGURE 5. For this purpose, the support lever 34 is expediently mounted on the same shaft with the catch lever 22 and is provided with a recess for engagement with a bent-up tab 22b of the catch lever.

The electronic timing device is provided with an additional contact switch $S_2$, designed as reverser, and actuatable as illustrated in FIGURE 4 by sector ring 2 of the shutter drive. The reverser switch $S_2$ consists of a contact tongue 37, in the form of a two-armed lever, mounted concentrically with the switch-on lever 25 and in electrically conductive connection therewith. In the normal position of the shutter, one end of the contact tongue 37 rests, under the influence of a spring 38 engaging the sector ring 2, against a fixed contact pin 40 which is mounted on the base 1 so as to be insulated therefrom. Cooperating with the other end of the contact tongue 37 is a movable contact pin 41, expediently attached to the contact lever 31 and electrically connected to the movable countercontact 30 of the contact maker $S_1$. The arrangement of the contact pin 41 and the design of contact tongue 37 are such that, as may be best seen in FIGURE 4, when sector ring 2 changes into the open position indicated in FIGURE 4, the contact tongue 37 can move from the fixed contact pin 40 but, just as the contact tongue 24 cannot touch the movable countercontact 30, the contact tongue 37 cannot touch the contact pin 41 arranged on the contact lever 31 when the setter 35 has first been set to "B."

As illustrated in FIGURE 1, a number of contact tips 42a to 42m are disposed above housing base 1, and adapted so that one of the tips is always connected to one of the gradated time regulating resistors of the electronic switching device. A slide contact 43 is fastened to the setter 35 serving as a tap which connects the appropriate fixed resistor with a slide 44 when an exposure time controlled by the electronic switching device is set. The contact tip 42a, cooperating with the fixed resistor for the shortest electronically controlled exposure time, is continued beyond the setting corresponding to this time value so that this resistor remains included in the electronic circuit for the shortest, unretarded exposure time as well as in the "B" setting. This enables the armature lever 10 to return into its starting position when taking "B" pictures even when the electromagnet 16 should have received voltage via contact tongue 37 and pin 41 during the return motion of the winding and release member 4 before the catch lever 22 has released the armature lever 10 for return. In that case, the electromagnet 16 is immediately made currentless by the reversal process in the electronic switching device so that it releases the armature lever 10 for return virtually without retardation.

The electronic switching device is designed as an emitter-coupled trigger circuit comprising essentially two transistors $T_1$ and $T_2$, a capacitor C and the time regulating resistors shown in the diagram as one single, variable resistor $R_1$. By means of an additional variable resistor $R_2$ the swell value of the electronic circuit is adjustable. In series with the switch $S_1$ and a battery 45 is the electromagnet 16 as well as the transistor $T_2$. The transistor $T_1$ and the capacitor C have a circuit relationship of their own. The reverser switch $S_2$ is so included in the circuit that it can act as a short circuit switch for the capacitor C or in parallel to the switch $S_1$.

The operating mode of the above described electronically controlled self-winding shutter illustrated in FIGURES 1 to 9 is as follows:

To take "B" pictures, setter 35 is brought into the appropriate position, whereby the concentric cam 35a and the recess 35c assume the position with respect to the switch-on lever 25 and the support lever 34 shown in FIGURE 3. The time regulating resistor assigned to the shortest controlled exposure time remains switched on in this setting. Depressing the winding and release member 4 moves the armature lever 10 clockwise and causes the armature 14 to contact the electromagnet 16. This causes the contact lever 31 after the release of the catch lever 22 by the drive pin 23 of the winding and release member 4, to turn clockwise under the influence of the spring 32 whereby, in turn, the support lever 34 drops into the recess 35c of the setter 35, and the catch lever 22 which corotates with the support lever 34 turns in a counter-clockwise direction.

Also during the winding motion, the switch-on lever 25 of the switch $S_1$ follows the pin 28 of the winding and release member 4 and as indicated by the dashed lines in FIGURE 3 is biased against the cam 35a. Due to the fact that the countercontact 30 is not engaged by the tongue 24 due to the limited motional freedom of the switch-on lever 25, the electronic time forming device is prevented from being switched on during the winding and release process. Also during this motion, the sector drive mechanism is transferred into the wound position in a conventional manner not shown by the lock pawl 6. After the armature 14 touches the electromagnet 16, the catch lever 22 with its arm 22a engages tab 10d of the armature lever 10, as illustrated in FIGURE 6 and so that the armature lever 10 is held against the electromagnet 16 by the catch lever 22 only after the drive tab 4a of the winding and release member 4 has moved away from engagement therewith.

At the end of the winding motion, the release of the shutter drive is finally accomplished by lock pawl 6 which drive causes the sector ring 2 to make a clockwise rotation thereby transferring the sectors into the open position. While this motion separates the contact tongue 37 of the reverser switch $S_2$ from the contact 40 due to the action of the spring 38, other end of the contact tongue 37 cannot make contact with the contact pin 41 because the latter has been moved away from the contact tongue 37 due to the rotation of the contact lever 31 at the beginning of the winding motion. This positioning motion of the contact tongue 37 accordingly results in no contact making either. When the sector ring 2 reaches the position corresponding to the open position of the sectors, the tab 17a of the locking lever 17 drops, under the influence of the cocked spring 19, into engagement with the shoulder 2b of slot 2a provided in the sector ring as illustrated in FIGURE 8, so that as a result, the shutter drive remains blocked as long as the pressure on the winding and release member 4 is maintained.

After the pressure has been released, the winding and release member 4 returns into its starting position under the effect of a return spring, whereby the catch lever 22 is pushed out of its locking position by the drive pin 23 so that armature lever 10 is free to move back into its starting position under the bias of the return spring 12, as shown in FIGURE 5. By means of its tab 10c the armature lever 10 can move the locking lever 17 so that its tab 17a will disengage from the shoulder 2b of sector ring 2, whereby the latter can instantly return into its starting position, transferring the sectors into the shut position. Should, due to assembly and manufacturing tolerances, a contact be established by the contact pin 41 touching the tongue 37 of the reverser switch $S_2$ during the return motion of the winding and release member 4, the electronic switching device and specifically the electromagnet 16 will receive voltage. However, since, in the "B" setting the time regulating resistor for the shortest controlled exposure time is switched on, the electronic circuit trips immediately after contact making so that electromagnet 16 is at once deenergized. Consequently, under these circumstances, the armature lever 10 can return into its starting position virtually simultaneously with the release of the winding and release member 4, thereby transferring the locking lever 17 into its ineffective position.

To take pictures with exposure times controlled by the electronic timing device, the settler 35 is set to the desired time value, say 1/60 sec. The concentric cam 35a thereby assumes the position illustrated in FIGURE 2 with respect to the support lever 34 and the switch-on lever 25. When depressing the winding and release member 4, the lever 34 is biased against the cam 35a thereby preventing a rotational motion of the countercontact 30 of the switch $S_1$ and of the contact lever 31 carrying the contact pin 41 of reverser switch $S_2$, and a dropping in of the catch lever 22 at the tab 10d of armature lever 10. Thus, the contact tongue 24 of the switch-on lever 25 strikes against the countercontact 30 during the releasing process, causing the electronic switching device and the electromagnet 16 to receive voltage. After the armature 14 touches the electromagnet 16 and the armature lever 10 departs from the drive tab 4a of the winding and release member 4, the armature lever 10 is held by the electromagnet in accordance with the preselected time. At the end of the winding process, the shutter drive is again released by the locking pawl 6, which results in the sector ring 2 transferring into the open position. The contact tongue 37 of reverser switch $S_2$ thereby disengages the contact pin 40, and simultaneously contacts in contrast to the "B" setting, the pin 41, by virtue of which the electronic switching device is additionally connected to the battery 45 via a contact parallel to the switch $S_1$. With the reversal of the contact tongue 37, charging of capacitor C begins which reaches, after a period determined by the time regulating resistor corresponding to the exposure time chosen, the base potential of transistor $T_1$. At that moment the electronic switching device trips, and the electromagnet 16 becomes currentless so that the armature lever 10 can return into its starting position and unlock the sector ring 2 which transfers the sectors into the shut position.

When setting to the shortest, unretarded exposure time achievable with the shutter, the shoulder 35b of the setter 35 positions itself opposite the support lever 34. In that setting, as in the "B" setting, the switch $S_1$ cannot be closed. However, because of the support lever 34 resting against shoulder 35b, the catch lever 22 is prevented from dropping in at the tab 10d of armature lever 10. The armature lever 10 will have already returned into its starting position prior to the opening motion of sector ring 2 so that locking lever 17 will not cause retardation of the shutter run-off.

It will be understood that the foregoing description with the details of exemplary structure is not to be construed in any way to limit the invention, but that modifications may be made thereto without departing from the scope of the invention as set forth in the following claims.

Having thus described my invention, I claim:

1. A photographic shutter with an electronic timing device comprising: a setter for said shutter adjustable to various exposure time values; a switch arrangement connecting said timing device electrically with a power source during release and run-off of said shutter, said switch arrangement having at least one countercontact cooperating with a contact tongue, said countercontact being movably mounted for automatic movement into a position preventing contact making during the release and run-off of said shutter when said setter is adjusted for taking "B" pictures.

2. The photographic shutter of claim 1 wherein said countercontact is disposed on a pivoted contact lever, said setter cooperating with said contact lever so that when said setter is adjusted for taking "B" pictures, said contact lever is biased to move said countercontact out of the range of motion of said contact tongue of said switch arrangement during the winding and releasing process.

3. The photographic shutter of claim 2 wherein said contact lever is biased into engagement with a support lever, and wherein said setter has a recess into which said support lever can move in releasing the shutter in the "B" setting of the setter, enabling said contact lever to bring said countercontact into the contact-free position.

4. The photographic shutter of claim 2 wherein said contact lever is a two-armed lever, one arm carrying a countercontact of a first switch actuatable when releasing the shutter, the other arm of said lever carrying a countercontact of a second switch connected electrically in parallel with said first switch, said second switch being influenceable by the drive means of said shutter.

5. A photographic shutter with an electronic timing device comprising: a base; shutter sector means on said base movable relative thereto into open and closed positions; drive means for moving said shutter sector means between open and closed positions; a setter on said base for adjusting said shutter to various exposure time values; switch means connecting said timing device with a power source during release and run-off of said shutter, said switch means having a countercontact engageable with a contact tongue, said countercontact being movably mounted for automatic movement into a position preventing contact with said contact tongue during release and run-off of said shutter upon adjustment of said setter for taking "B" pictures.

6. The photographic shutter of claim 5 wherein said countercontact is disposed on a contact lever pivotally mounted on said base; and wherein said contact lever is spring biased to move said countercontact away from said contact tongue; and wherein said setter is operably connected to said switch means to allow said contact lever to move said countercontact out of the range of motion of said contact tongue during the winding and releasing process when said setter is adjusted for taking "B" pictures.

7. The photographic shutter of claim 6 wherein said contact lever is biased into engagement with a support lever, and wherein said setter is operably connected to said switch means by said support lever; and wherein said setter has a recess receiving said support lever in the "B" setting of said setter, said support lever being positioned to allow said contact lever and said countercontact to move into the contact free position when said support lever is disposed in said recess of said setter.

8. The photographic shutter of claim 6 wherein said contact lever of said switch means has two arms, one of said arms carrying a countercontact of a first switch actuatable upon release of said shutter, the other arm of said arms carrying a countercontact of a second switch connected electrically in parallel with said first switch, said second switch being operatively engaged with said drive means.

References Cited

UNITED STATES PATENTS 3,187,653   6/1965   Rentschler _____ 95—53.3

FOREIGN PATENTS 1,230,307   8/1966   Germany.

NORTON ANSHER, Primary Examiner

D. B. WEBSTER, Assistant Examiner

U.S. Cl. X.R.

95—53